United States Patent
Young et al.

(10) Patent No.: US 9,305,214 B1
(45) Date of Patent: Apr. 5, 2016

(54) SYSTEMS AND METHODS FOR REAL-TIME HORIZON DETECTION IN IMAGES

(71) Applicants: Gracie Bay Young, San Diego, CA (US); Corey A. Lane, San Diego, CA (US); Bryan D. Bagnall, San Diego, CA (US); Shibin Parameswaran, San Diego, CA (US)

(72) Inventors: Gracie Bay Young, San Diego, CA (US); Corey A. Lane, San Diego, CA (US); Bryan D. Bagnall, San Diego, CA (US); Shibin Parameswaran, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 170 days.

(21) Appl. No.: 14/065,469

(22) Filed: Oct. 29, 2013

(51) Int. Cl.
 *G06K 9/00* (2006.01)
 *G06K 9/62* (2006.01)
 *G06T 5/00* (2006.01)

(52) U.S. Cl.
 CPC .......... *G06K 9/00523* (2013.01); *G06K 9/6218* (2013.01); *G06T 5/002* (2013.01)

(58) Field of Classification Search
 None
 See application file for complete search history.

(56) References Cited

U.S. PATENT DOCUMENTS

| | | | | |
|---|---|---|---|---|
| 5,027,413 A * | 6/1991 | Barnard | ............... | G06K 9/3241 250/332 |
| 6,865,521 B1 * | 3/2005 | Padgett | .................... | G01V 1/30 367/68 |
| 7,398,016 B2 * | 7/2008 | Cheng | ..................... | G03B 7/08 348/362 |
| 8,275,170 B2 * | 9/2012 | Lee | ....................... | G06K 9/3233 348/113 |
| 8,958,602 B1 * | 2/2015 | Lane | ...................... | G06T 7/2033 348/143 |
| 2007/0002275 A1 * | 1/2007 | Yan | ........................ | G06T 7/0012 351/200 |
| 2007/0104475 A1 * | 5/2007 | Cheng | ..................... | G03B 7/08 396/234 |
| 2008/0056619 A1 * | 3/2008 | Ujisato | ................ | G06K 9/3241 382/305 |
| 2008/0137960 A1 * | 6/2008 | Lee | ....................... | G06K 9/3233 382/195 |
| 2008/0187219 A1 * | 8/2008 | Chen | .................. | G06K 9/00711 382/173 |
| 2008/0199045 A1 * | 8/2008 | Ekin | ................... | G06K 9/00791 382/104 |
| 2008/0239076 A1 * | 10/2008 | Luo | ..................... | G06K 9/00798 348/148 |

(Continued)

OTHER PUBLICATIONS

Nasim Sepehri Boroujeni et al., "Robust Horizon Detection Using Segmentation for UAV Applications", IEEE Computer Society, 2012 Ninth Conference on Computer and Robot Vision, pp. 346-352.

(Continued)

*Primary Examiner* — Chan Park
*Assistant Examiner* — Iman K Kholdebarin
(74) *Attorney, Agent, or Firm* — SSC Pacific Patent Office; Arthur K. Samora; Kyle Eppele

(57) ABSTRACT

Methods for detecting a horizon in an image with a plurality of pixels can include the step of blurring the image with a noise filter, then dividing the image into an M×N matrix of sub-blocks S. For each sub-block S, horizon features can be coarse-extracted by defining an r-dimensional vector having P feature values for each sub-block S and clustering each r-dimensional vectors into two clusters using a k-means statistical analysis. The corresponding sub-blocks S corresponding to the two clusters can be masked with a binary mask. The methods can further include the step of fine-extracting the horizon features at a pixel level for each sub-block $S_{i,j}$ and sub-block $S_{i-1,j}$ when the binary mask changes value from sub-block $S_{i-1,j}$ to said sub-block $S_{i,j}$, for i=1 to M and j=1 to N.

20 Claims, 11 Drawing Sheets

(56) References Cited

U.S. PATENT DOCUMENTS

| | | | | |
|---|---|---|---|---|
| 2009/0290809 | A1* | 11/2009 | Yamada | G06T 7/0042 382/266 |
| 2011/0064301 | A1* | 3/2011 | Sun | G06K 9/468 382/159 |
| 2012/0154208 | A1* | 6/2012 | Wood | G01S 7/414 342/205 |
| 2013/0287292 | A1* | 10/2013 | Ono | G06K 9/00201 382/154 |
| 2014/0023278 | A1* | 1/2014 | Krishna Kumar | G06K 9/4671 382/192 |
| 2014/0314270 | A1* | 10/2014 | Nguyen | G06K 9/0063 382/103 |
| 2015/0356450 | A1* | 12/2015 | Dursun | E21B 41/00 706/12 |

OTHER PUBLICATIONS

Patrick Y. Shinzato et al., "Fast Visual Recognition and Horizon Detection Using Multiple Artificial Neural Networks", 2012 INtelligent Vehicles Symposium, Alcala' de Henares, Spain, Jun. 3-7, 2012, pp. 1090-1095.

Hong-Zhao Yuan et al., "Horizon Detection in Foggy Aerial Image", 978-1-4244-5555-3/10, IEEE, 2010 (4 pages).

Fefilatyev, Sergiy et al., "Horizon Detection Using Machine Learning Techniques", IEEE Computer Society, Proceedings of the 5th International Conference on Machine Learning and Applications (ICMLA '06), 4 pages.

* cited by examiner

SYSTEMS AND METHODS FOR REAL-TIME HORIZON DETECTION IN IMAGES

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 102786.

FIELD OF THE INVENTION

The present invention pertains generally to the detection of the horizon in images. More specifically, the present invention pertains to the methods for real-time detection of the horizon in images with sufficient speed and efficiency to allow for detection of the horizon in full motion video.

BACKGROUND OF THE INVENTION

When reviewing and analyzing imagery, it can often be advantageous to locate the horizon within the given image. This is because an image observer may only be interested in what is below (or above) the horizon. For example, for an image of the ocean containing a plurality of ships, if an analyst is only interested in observing the ships, the observer is not interested in searching for any contact above the horizon (in the sky). On the other hand, if the contacts of interest are airborne, the analyst is not interested in the portion of the image that is below the horizon.

Real-time horizon detection in full-motion videos can be an even more important capability that can aid and can facilitate real-time processing of full motion videos, for purposes such as object detection, recognition and other video/image segmentation purposes. A horizon detection system can be used to speed up processing time per frame of a video by ignoring parts of the videos that are not relevant to the object detection. For example, a ground vehicle detection and tracking system can greatly reduce system processing time by ignoring parts of the image that contains sky. This can also lead to a decrease in false detects in the underlying anomaly detection process of this system.

In view of the above, it is an object of the present invention to provide systems and methods for real-time horizon detection in imagery that can identify the horizon from frames, irrespective of the angle at which the horizon appears in the frame and irrespective of the presence or absence of objects occluding the horizon line in the image frame. Another object of the present invention to provide systems and methods for real-time horizon detection in imagery that can locate the image horizon without losing the objects that are close to the horizon line. Yet another object of the present invention to provide systems and methods for real-time horizon detection in imagery that can be used as a front-end processing unit for video imagery, for a larger marine object detection system. Still another object of the present invention to provide systems and methods for real-time horizon detection in imagery that can improve the object detection and processing speed of Maritime Domain Awareness (MDA) system by ignoring parts of the image where an object will not be found, e.g. a ship above the horizon (in the sky). Still another object of the present invention to provide systems and methods for real-time horizon detection that can minimize the possibility of false maritime detections from the sky region. Another object of the present invention to provide systems and methods for real-time horizon detection that are easy to use in a cost-efficient manner.

SUMMARY OF THE INVENTION

Methods for detecting a horizon in an image with a plurality of pixels can include the initial step of blurring the image with a noise smoothing filter. The blurred image can be divided into an M×N matrix of sub-blocks S. For each sub-block S, horizon features can be coarse-extracted by defining an r-dimensional vector having P feature values for each of sub-blocks S, and then clustering each of the r-dimensional vectors into two clusters using a k-means statistical analysis. The corresponding sub-blocks S corresponding to the two clusters can be masked with a binary mask. The methods according to several embodiments can further include the step of fine-extracting the horizon features at a pixel level for each pixel in sub-block $S_{i,j}$ and sub-block $S_{i-1,j}$ when the binary mask changes value from said sub-block $S_{i-1,j}$ to said sub-block $S_{i,j}$, for i=1 to M and j=1 to N.

The result is an image with masked pixels, which can define a fine horizon at a pixel level for the image. Optionally, the unmasked pixels can be further processed according to the user's needs, while the masked pixels can be disregarded. The methods of the present invention can be accomplished by any means capable of generating an image, and a processor that can receive the images, and that can include non-transitory instructions for accomplishing the methods. Examples can include images from a satellite, a surveillance camera on a port, buoy, periscope or an unmanned aerial vehicle (UAV), and the like.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
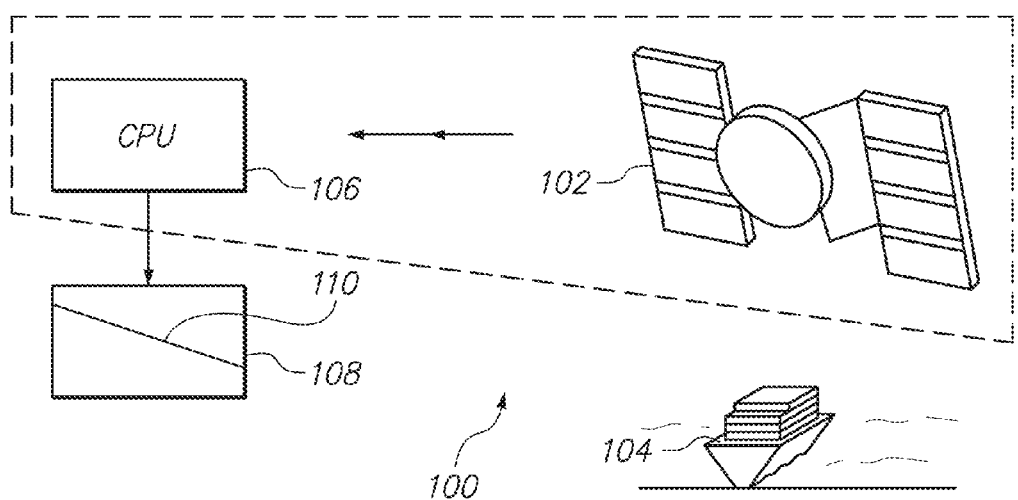
FIG. 1 is a schematic diagram of a system of the present invention according to several embodiments.

Referring now to FIG. 1, a system for processing of satellite imagery of vessels is shown and generally designated by reference character 100. As shown, system 100 can include an image generation means 102 such as a satellite, which can be connected to processor 106, and which can detect ships/vessels 104 and generate images 108 using imagery methods that can be known in the art. One such imagery method can include nadir panchromatic electro-optical imagery. One such system and methods for detection of ship providing such satellite imagery input into the present invention can be found in U.S. patent Ser. No. 12/197,421 by Buck et al. for an invention entitled "Ship Detection System and Method from Overhead Images", which is assigned to the same assignee as the present invention. Other image generation means, such as, but not limited to, shipboard mounted cameras, harbor cameras and UAV-mounted cameras could also be used. The processor 106 can include non-transitory instructions for accomplishing the methods for locating the horizon 110 in image 108. The manner in which the system 100 can identify the horizon 110 in image 108 can be described more fully below System 100 can be adapted to be used as a front-end processing unit for a larger marine object detection system that carries out object detection and tracking on full motion videos. As mentioned above, the image generation means can be ship/harbor-mounted cameras, UAVs etc., and the real-time capability of system 100 can be ideal for Maritime Domain Awareness (MDA) and other surveillance operations. The large amounts of video data collected for these operations warrant the need for real-time or faster than real-time video processing and analysis systems. Using a horizon detection system to pre-process the video data can improve the overall performance of a marine detection and tracking system in the following ways: 1) It can improve the processing speed of the system by allowing it to ignore parts of the image where a marine object will not be found, for e.g. way above the horizon (sky); 2) It can eliminate the possibility of false detections from the sky region which can improve the overall performance of the system and provides better detection results; and, 3) It can be leveraged to stabilize the video frames which is a crucial capability to develop successful object tracking systems.

Figure 2:
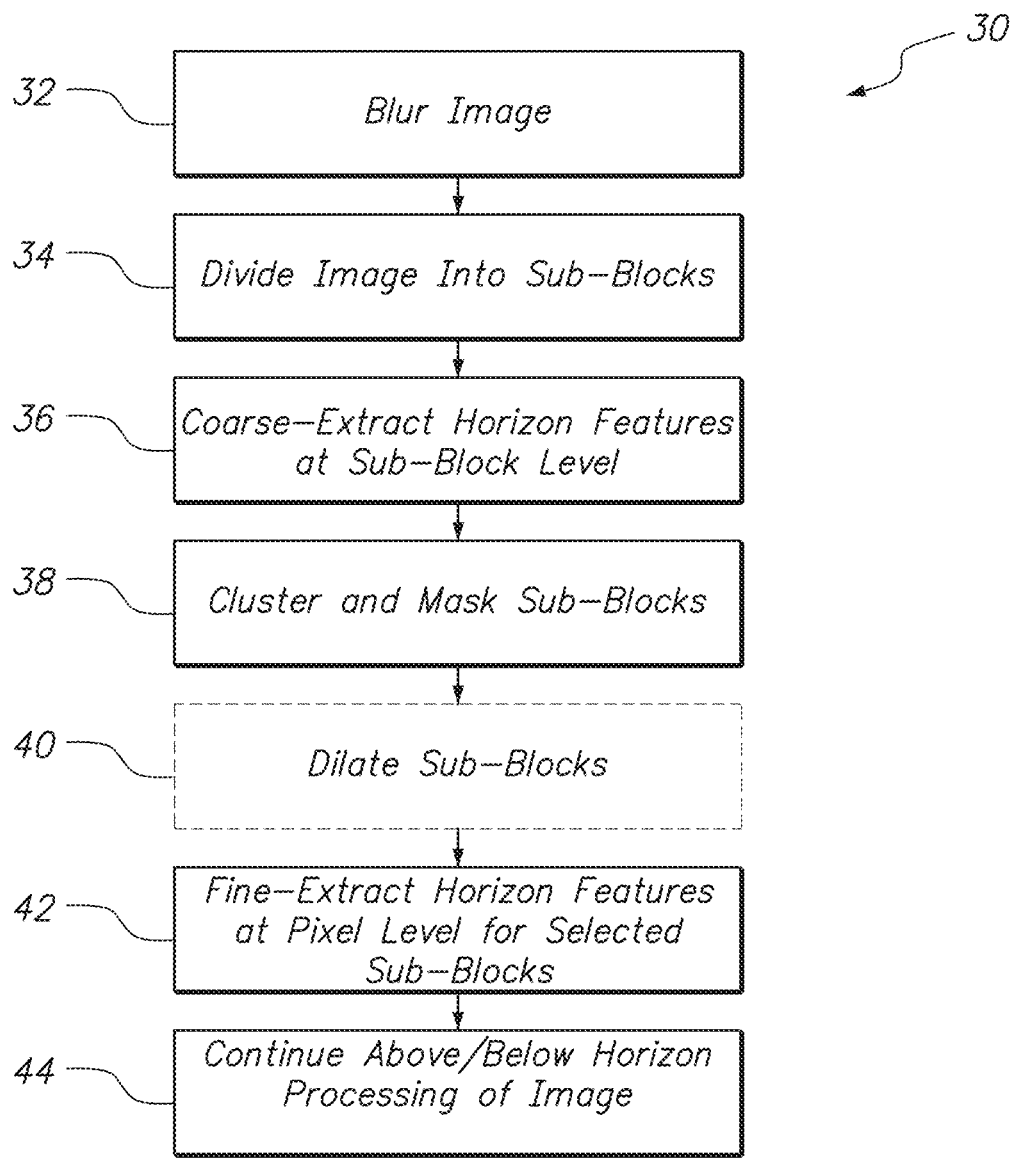
FIG. 2 is a block diagram, which illustrates steps that can be taken to practice the methods of the present invention according to several embodiments.
Figure 3:
FIG. 3 is a color photograph of an image containing a horizon, which can illustrate the methods of FIG. 2.
Figure 4:
FIG. 4 is the color photograph of FIG. 3 once the blurring step of FIG. 2 has occurred.

Referring now to FIGS. 2-4, a block diagram 30 is shown, which can be representative of the methods of the present invention according to several embodiments. As shown, method 30 can include the initial step of blurring the image, as shown by block 32. The blurring step can be thought of as a noise reduction step, which can be used to smooth out the unwanted noise present in the image (such as whitecaps in an image that includes the ocean), and other patterns in the sky.

An example of such a situation is shown in FIG. 3, and FIG. 3 can function as representative image to refer to when discussing the methods of the present invention according to several embodiments. The effect of the blurring step can be seen by comparing image 108 in FIG. 3 (pre-blurring) to image 108 in FIG. 4 (post-blurring). The size and type of filter that is used to the blur the image could also be varied according to the patterns and noise clutter present in the images. Example of such filters can include Normalized box filters, median filters, Gaussian filter and bilateral filters.

Figure 5:
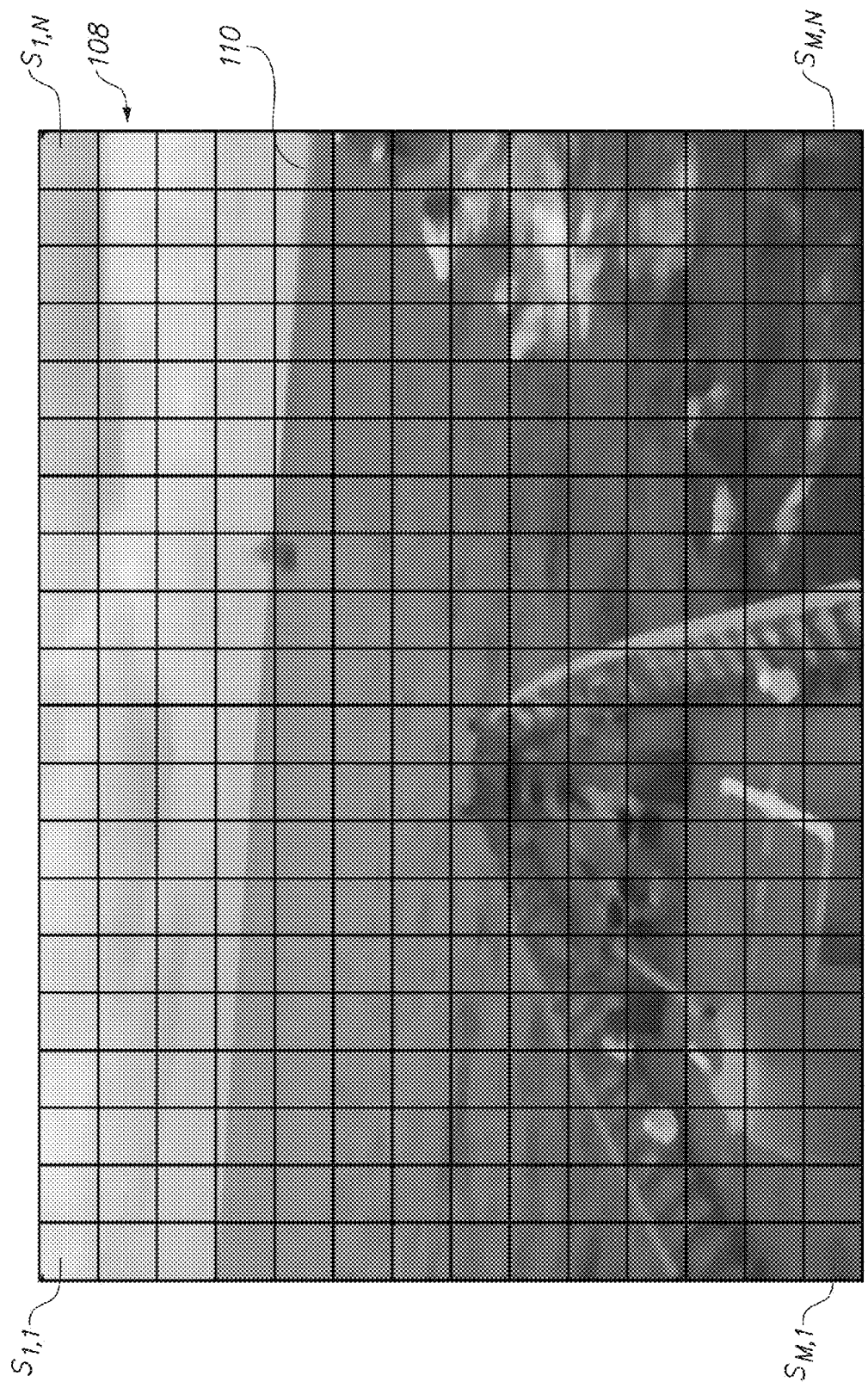
FIG. 5 is the color photograph of FIG. 4 once the dividing step of FIG. 2 has occurred.

Referring again to FIG. 2, the methods 30 can further include the step 34 of dividing the blurred image 108 into an M×N matrix of sub-blocks S. The size of sub-blocks S can be chosen according to clutter present in image 108 the overall number of pixels in the image 108 and the available processing speed of processor 106. Typically, a 5 pixel-by-5 pixel sub-block can be selected, but other size sub-blocks S can be chosen. FIG. 5 illustrates the result of this step, with sub-blocks $S_{1,1}$, $S_{1,N}$, $S_{M,1}$, and $S_{M,N}$ denoted to illustrate the number of sub-blocks.

Figure 6:
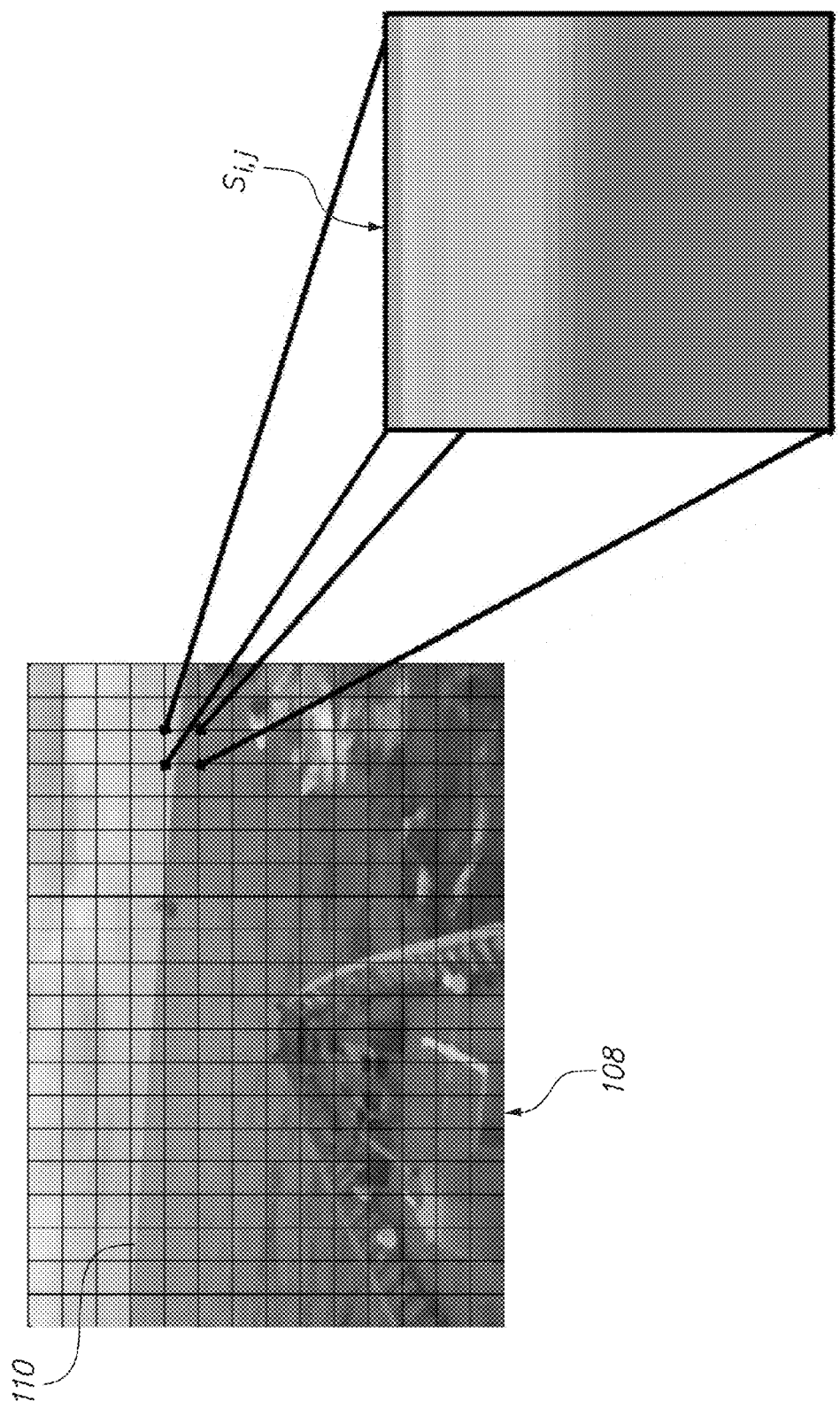
FIG. 6 is a color photograph of a sub-block S of the color photograph of FIG. 5.
Figure 7:
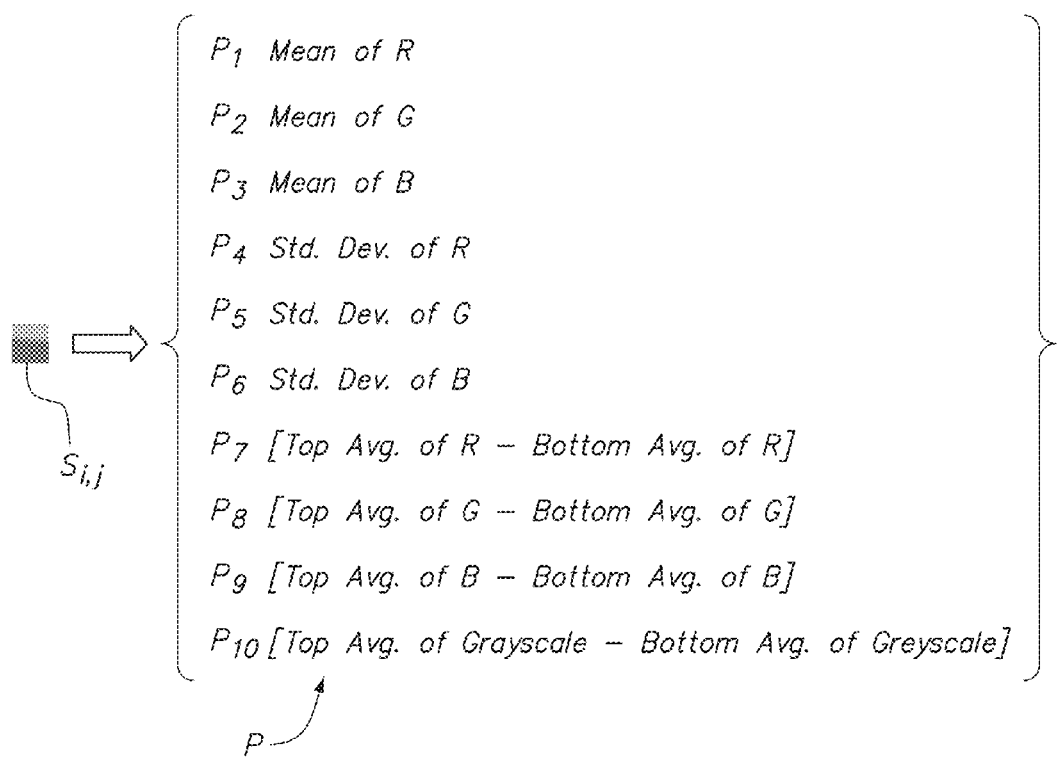
FIG. 7 is a color photograph of an exemplary sub-block S of FIG. 6 and a representation of the r-dimensional vector that is used to represent sub-block S by the methods of the present invention.

Referring now to FIGS. 2, and 6-7, the methods 30 according to several embodiments can also include the step of coarse-extracting horizon features from image 108, as depicted by block 36. To do this, each sub-block $S_{i,j}$ can be described as an r-dimensional vector $P_{i,j}$ having several features values $P_1$ through $P_{10}$ (See FIGS. 6 and 7, in the exemplary embodiments r=10, but r can be any number sufficient to allow for clustering), where $P_1=R_{mean}$, or the mean value of the Red channel in the RGB (Red-Green-Blue) representation of the image of all pixels in corresponding sub-block $S_{i,j}$. Similarly, $P_2=G_{mean}$, mean value of Green channel and $P_3=B_{mean}$, or the mean value of Blue channel of all the pixels in sub-block $S_{i,j}$.

Continuing with the values of vector $P_{i,j}$, and as shown in FIG. 7, $P_4=R_\sigma$ can be the standard deviation of the Red values of the pixels in the sub-block that corresponds to vector $P_{i,j}$. Similarly, $P_5=G_\sigma$ can be the standard deviation of the Green values of the pixels and $P_6=B_\sigma$ can be the standard deviation of the Blue values of the pixels. Finally vector $P_{i,j}$ can include feature values that leverage and describe the average R (Red), G (Green), Blue (B) and grayscale (GRAY) values of the top row and bottom row of pixels in sub-block $S_{i,j}$. More specifically, $P_7=[(\text{average R of } R_{1,1} \text{ through } R_{1,n})-(\text{average R of } R_{m,1} \text{ through } R_{m,n})]$, $P_8=[(\text{average G of } G_{1,1} \text{ through } G_{1,n})-(\text{average G of } G_{m,1} \text{ through } G_{m,n})]$, $P_9=[(\text{average B of } B_{1,1} \text{ through } B_{1,n})-(\text{average B of } B_{m,1} \text{ through } B_{m,n})]$ and $P_{10}=[(\text{average GRAY of } GRAY_{1,1} \text{ through } GRAY_{1,n})-(\text{average GRAY of } GRAY_{m,1} \text{ through } GRAY_{m,n})]$. For these embodiments, the variables "m" and "n" refer to the pixels in the m×n matrix of pixels in each sub-block $S_{i,j}$. For a 5×5 pixel sub-block S, m=1 to 5 and n=1 to 5. It should be appreciated, however, that "m" and "n" do not necessarily need to equal 5, nor do "m" and "n" need to equal each other to practice the methods of the present invention (such as in a panoramic image, for example).

It should also be appreciated that the above-listed feature values were used for the embodiments of the present invention that are described herein. It should be appreciated however, that more (or less) feature values could be used to describe vector P, provided there are enough feature values in the vectors to allow for a statistical analysis that clusters, or groups, the vectors belonging to the two regions of interest into two separate classes. Similarly, other feature characteristics such as mode or variance of the R, G and B pixels values could be used, or the standard deviation could even be biased, as long as the features that are chosen allow for vectors P that can be clustered. It should be appreciated, however, that feature vectors can have other statistical analyses, which can be based on whether the image 108 can have different features, textures or color spaces that can be extracted. Different features may have different complexities, and thus more calculation times, but the systems and methods could also be used for these cases.

Figure 8:
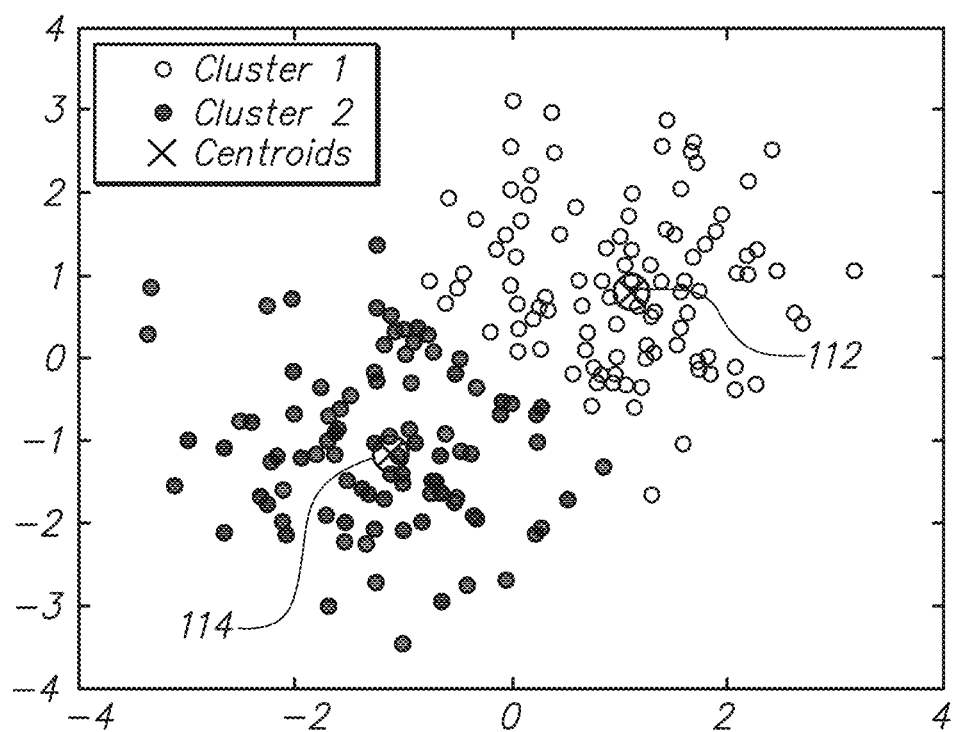
FIG. 8 is a simplified graphical depiction (the clusters are actually in a P dimensional space) of k-means statistical analysis used to process the r-dimensional vector of FIG. 7.
Figure 9:
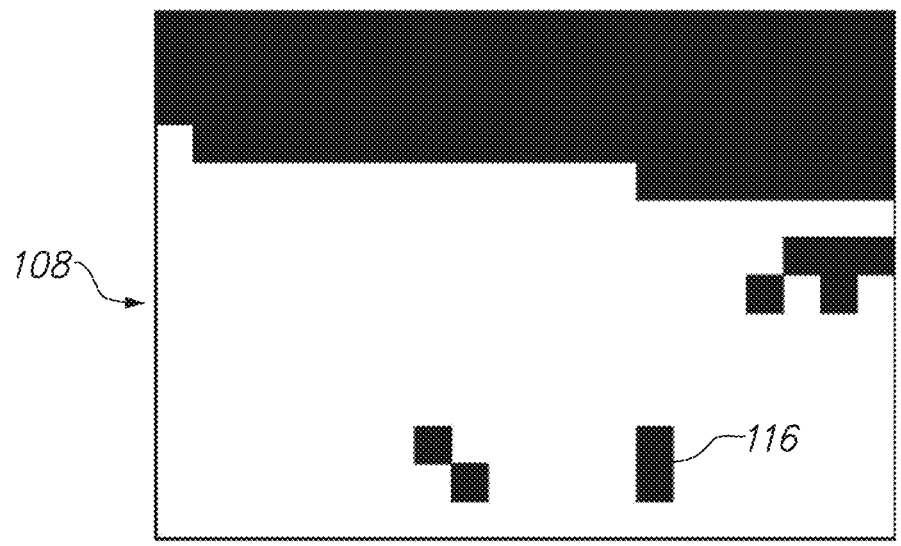
FIG. 9 is a black and white drawing of the image of FIG. 6 once the block masking of the methods of several embodiments has occurred.

Referring now to FIGS. 2 and 8-9, the methods according to several embodiments can include the steps of clustering the $P_{i,j}$ vectors and masking the $S_{i,j}$ sub-blocks corresponding to the $P_{i,j}$ vectors, as indicated by block 38 in FIG. 2 (When referring to image 108 in FIGS. 9-11 and 13, it should be appreciate that image 108 still contains the original data from image 108 in FIG. 3). To accomplish the clustering, a k-means clustering algorithm can be used and the value of k can be set to 2. This step can cluster the blocks into two clusters in the r-dimensional feature space, which can eventually lead to a clear separation between sky sub-blocks and non-sky sub-blocks. The results of such a clustering (clusters 112 and 114) can be seen in the graph at FIG. 8. As shown in the FIG. 9, a binary mark can then be used by assigning a binary (0-1) value to each sub-block $S_{i,j}$, based on the clustering results of the correspond N-dimensional vector $P_{i,j}$. One value (0 or 1) can be assigned to one cluster 112, while the other value can be assigned to the second cluster 114 (or vice versa).

The result of the above is a binary mask value that can be assigned to each sub-block S, depending on which cluster 112, 114 the corresponding P vector is in. An image that has been masked at a sub-block S level is depicted in FIG. 9. As shown in FIG. 9, there may be sporadic clustering errors that result in sub-block outliers 116. Any cluster outliers 116 such as those illustrated in FIG. 9 can be removed from the image 108. This can be accomplished via image dilation and erosion of the binary mask image 108, as indicated by step 40 in FIG. 2. In some embodiments, it may be useful to accomplish step 40 multiple times. In still other embodiments, there may not be any outliers and it may not be necessary to accomplish this step.

Figure 10:
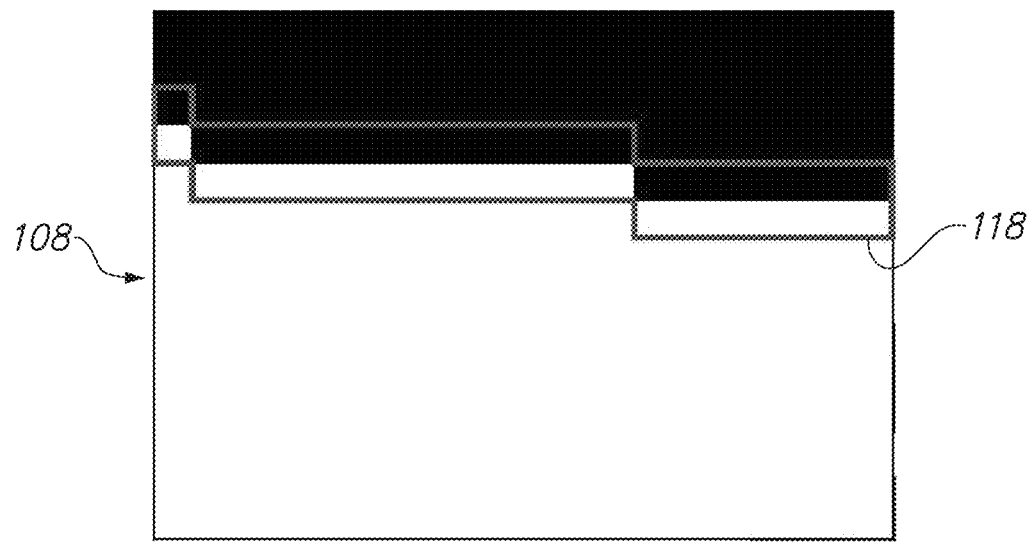
FIG. 10 is a the same drawing of FIG. 9 once the dilation and erosion steps of the methods shown in FIG. 2 has occurred, with the sub-blocks S that are selected for fine-extraction highlighted for clarity.
Figure 11:
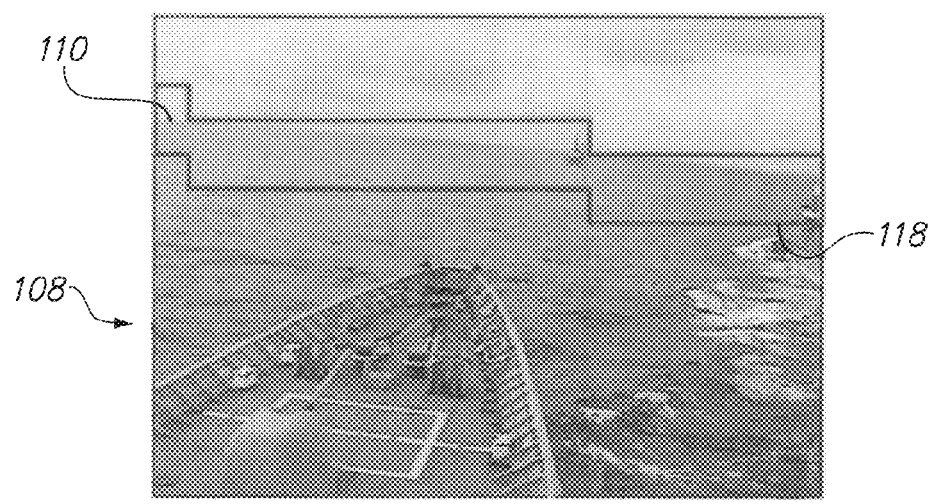
FIG. 11 is the color photograph of FIG. 3, which shows the highlighted portion of FIG. 10 superimposed over the original image, to illustrate the portions of the image that have been identified for fine-extraction once masking and dilation steps of the methods of FIG. 2 have occurred.

FIG. 10 can illustrate the image 108 which has been masked at a sub-block granularity level using the methods of several embodiments as described above once the dilation step has been accomplished. Once image 108 has been masked in the manner, certain sub-blocks S can be selected for further masking at a pixel level. The sub-blocks S that are of interest are highlighted in portion 118 of image 108. To select the sub-blocks S for further processing to detect the horizon, the sub-blocks that contain the horizon line can be found by iterating through top to bottom of the N columns of blocks in image 108, picking the first block to change class/mask value (0 to 1 or 1 to 0) along with the sub-block S preceding it. Stated differently, for each sub-block $S_{i,j}$, if the binary mask changes value from the mask value sub-block $S_{i+1,j}$ immediately below sub-block $S_{i,j}$, both sub-block $S_{i,j}$ and sub-block $S_{i+1,j}$ can be selected for further processing at a pixel level. This can occur for each said sub-block for i=1 to M−1 and j=1 to N.

Once the sub-blocks S for image 108 have been selected as described above (i.e., the sub-blocks S within portion 118 of image 108), and referring to FIGS. 2 and 10-12, the methods according to several embodiments can include the step of fine-extracting horizon features at a pixel level for the selected sub-blocks S from the original image 108, as depicted by step 42 in FIG. 2. To do this, an I-dimensional Q vector can be defined with four values (I=4 for these embodiments described herein, but I could be any value that is sufficient to provide for clustering of the Q vectors) for each pixel in sub-block S within area 118, (R, G, B and GRAY are as defined above). This is illustrated in sub-step 46 in FIG. 12.

Figure 12:
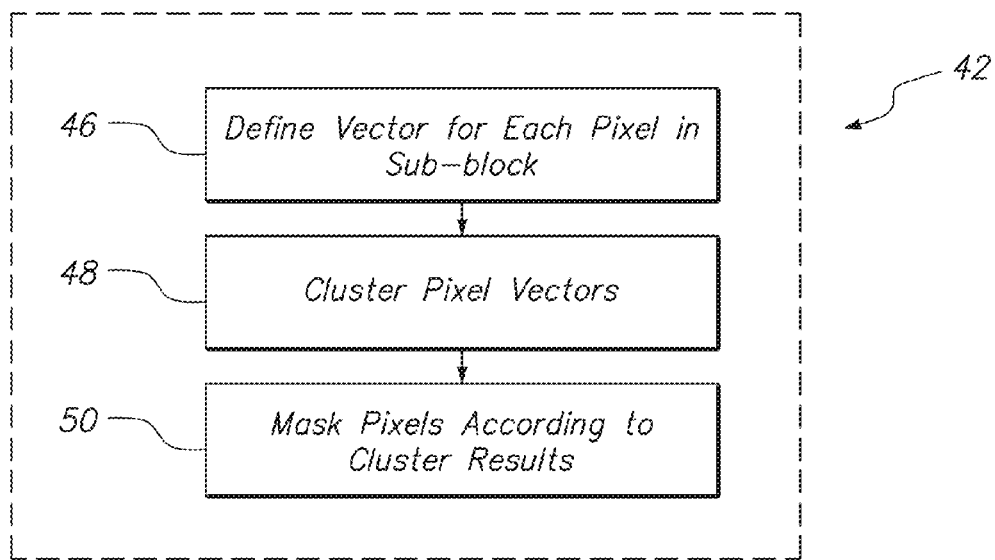
FIG. 12 is a block diagram, which illustrates sub-steps that can be taken to accomplish fine-extraction step depicted in FIG. 2; and, FIG. 13 is a black and white drawing of the horizon in FIG. 3 once the fine-extraction step has occurred.
Figure 13:
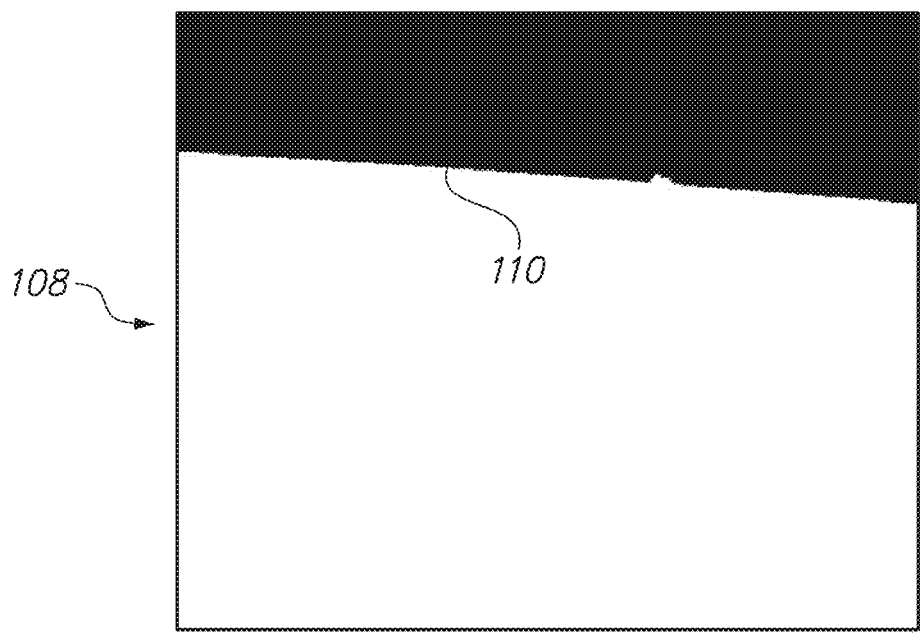

Next, the pixel-wise Q vectors can be clustered as shown in step 48 of FIG. 12 using a k-means statistical analysis (or any other statistical analysis method that results in a clustering into two groups with a minimum of outliers).

The methods can further include the step 50 of masking the pixel results, using the results of the Q vector clustering. The result is a "fine" horizon that has been found at a pixel level within an image 108, but precious processing resources were only significantly expended on portion 118 of image 108. Once horizon 110 in image 108 has been found, referring briefly back to FIG. 2, the image (with the located horizon) can be passed to a surveillance or other system, and the portions above horizon 110 or below horizon 110 can be processed by other methods and other inventions, or ignored, according to how the image 108 was masked and the desires of the end user.

The systems and methods of the present invention can be fast and can be used in real-time video processing applications. No assumptions about the angle or appearance of the horizon in the image are made or needed. As mentioned above, the clustering stages can be altered to use more powerful clustering strategies (i.e. k can be chosen to be a different value or a different statistical model can be used; however, depending on the complexity of the method, this can lead to an increase in the processing time by processor. Additionally, if more information about the video or scenes captured are known a priori, then supervised/semi-supervised machine learning algorithms can be used in place of unsupervised clustering algorithms to "separate" the sub-block and pixels.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:
1. A method for detecting a horizon in an image, said method comprising the steps of:
   A) blurring said image;
   B) dividing said image into an M×N matrix of sub-blocks $S_{ij}$, for i=1 to M and J=1 to N, each said sub-block $S_{ij}$ having a plurality of pixels;
   C) coarse-extracting horizon features at a said sub-block $S_{ij}$ granularity level by defining an r-dimensional vector having r feature values for each of said sub-blocks $S_{ij}$;
   D) clustering each of said r-dimensional vectors into two clusters using said feature values;
   E) masking each of said sub-blocks $S_{ij}$ at a said sub-block $S_{ij}$ granularity level corresponding to said r-dimensional vectors using a binary mask according to the results of said step D);
   E1) selecting a sub-blocks $S_{ij}$ and sub-blocks $S_{i+1,j}$ from said step E) when sub-block $S_{ij}$ has a different mask value from the sub-block $S_{i+1,j}$, step E1) being accomplished for i=1 to M−1 and J=1 to N; and,
   F) fine-extracting said horizon features at a pixel level, said fine-extracting step being accomplished only on the sub-blocks $S_{ij}$ from said step E1.

2. The method of claim 1 further comprising the step of:
   G) dilating and eroding each of said sub-blocks $S_{ij}$, said step G) being accomplished after said step E) and before said step F).

3. The method of claim 1, wherein said M and said N are chosen according to the overall number of said pixels in said image.

4. The method of claim 1, wherein said step A) is accomplished using a noise filter selected from the group consisting of Normalized box filter, median filter, Gaussian filter and bilateral filter.

5. The method of claim 1, wherein said sub-blocks $S_{ij}$ comprises an m×n matrix of said pixels, and wherein said feature values from said step C) are selected from the group consisting of $R_{mean}$, $G_{mean}$, $B_{mean}$, $R_o$, $G_o$, $B_o$, [(average R of $R_{1,1}$ through $R_{1,n}$)−(average R of $R_{m,1}$ through $R_{m,n}$)], [(average G of $G_{1,1}$ through $G_{1,n}$)−(average G of $G_{m,1}$ through $G_{m,n}$)], [(average B of $B_{1,1}$ through $B_{1,n}$)−(average B of $B_{m,1}$ through $B_{m,n}$)] and [(average GRAY of $GRAY_{1,1}$ through $GRAY_{1,n}$)−(average GRAY of $GRAY_{m,1}$ through $GRAY_{m,n}$)].

6. The method of claim 1, wherein said step D) is accomplished using a k-means algorithm.

7. The method of claim 1, wherein said step F) further comprises the steps of:
   F1) defining an I-dimensional Q vector for each of said pixels in said sub-blocks $S_{i,j}$ and $S_{i+1,j}$, said Q vector having I pixel feature values;
   F2) clustering said Q vectors into two clusters according to said pixel feature values; and,
   F3) masking some of said pixels using said binary mask according the results of said step F2) for said Q vector corresponding to said pixels.

8. The method of claim 7, wherein said pixel feature values are selected from the group consisting of R, G, B and GRAY.

9. A method of increasing the processing speed of detection of objects within an image, said method comprising the steps of:
   A) blurring said image;
   B) dividing said image into an M×N matrix of sub-blocks $S_{ij}$, each said sub-block S having a plurality of pixels;
   C) coarse-extracting horizon features at a said sub-block $S_{ij}$ granularity level by defining an r-dimensional vector having r feature values for each of said sub-blocks $S_{ij}$;
   D) clustering each of said r-dimensional vectors into two clusters using said feature values;
   E) masking each of said sub-blocks $S_{ij}$ at a said sub-block $S_{ij}$ granularity level corresponding to said r-dimensional vectors using a binary mask according to the results of said step D);
   E1) selecting sub-blocks $S_{ij}$ and sub-blocks $S_{i+1,j}$ from said step E) when sub-block $S_{ij}$ has a different mask value from the sub-block $S_{i+1,j}$ immediately below said sub-block $S_{ij}$; and,
   F) fine-extracting said horizon features, said fine-extracting step being accomplished only on the sub-blocks $S_{ij}$ from said step E1, said step resulting in masked said pixels and unmasked said pixels; and,
   G) further processing said unmasked pixels while disregarding said masked pixels.

10. The method of claim 9 further comprising the step of:
    H) dilating each of said sub-blocks, said step H) being accomplished after said step E) and before said step F).

11. The method of claim 9, wherein said value M and said value N are chosen according to the number of said pixels in said image.

12. The method of claim 9, wherein said step A) is accomplished using a noise filter selected from the group consisting of Normalized box filter, median filter, Gaussian filter and bilateral filter.

13. The method of claim 9, wherein said sub-block $S_{ij}$ comprises an m×n matrix of said pixels, and wherein said feature values from step C) are selected from the group consisting of $R_{mean}$, $G_{mean}$, $B_{mean}$, $R_o$, $G_o$, $B_o$, [(average R of $R_{1,1}$ through $R_{1,n}$)−(average R of $R_{m,1}$ through $R_{m,n}$)], [(average G of $G_{1,1}$ through $G_{1,n}$)−(average G of $G_{m,1}$ through $G_{m,n}$)], [(average B of $B_{1,1}$ through $B_{1,n}$)−(average B of $B_{m,1}$ through $B_{m,n}$)], [(average GRAY of $GRAY_{1,1}$ through $GRAY_{1,n}$)−(average GRAY of $GRAY_{m,1}$ through $GRAY_{m,n}$)].

14. The method of claim 9, wherein said step D) is accomplished using a k-means algorithm.

15. The method of claim 9, wherein said step F) further comprises the steps of:
    F1) defining an I-dimensional Q vector for each of said pixels, said Q vector having I pixel feature values;
    F2) clustering said Q vectors into two clusters according to said pixel feature values; and,
    F3) masking some of said pixels using said binary mask according the results of said step F2) for said Q vector corresponding to each of said pixels.

16. The method of claim 15, wherein said pixel feature values are selected from the group consisting of R, G, B and GRAY.

17. A device, comprising:
    a means for generating an image;
    a processor connecting to said generating means, said processor including non-transitory instructions for accomplishing a method, said method comprising the steps of:
    A) blurring said image;
    B) dividing said image into an M×N matrix of sub-blocks $S_{ij}$, each said sub-block S having a plurality of pixels;
    C) coarse-extracting horizon features at a said sub-block $S_{ij}$ level by defining an r-dimensional vector having r feature values for each of said sub-blocks $S_{ij}$;
    D) clustering each of said r-dimensional vectors into two clusters using said feature values;
    E) masking each of said sub-blocks $S_{ij}$ at a said sub-block $S_{ij}$ level corresponding to said r-dimensional vectors using a binary mask according to the results of said step D);

E1) selecting sub-blocks $S_{ij}$ and sub-blocks $S_{i+1,j}$ from said step E) when sub-block $S_{ij}$ has a different mask value from the sub-block $S_{i+1,j}$ immediately below said sub-block $S_{ij}$; and, F) fine-extracting said horizon features, said fine-extracting step being accomplished only on the sub-blocks $S_{ij}$ from said step E1.

18. The device of claim 17, wherein said method further comprises the step of:

G) dilating each of said sub-blocks, said step G) being accomplished after said step E) and before said step F).

19. The device of claim 17, wherein said value M and said value N are chosen according to an overall number of said pixels in said image.

20. The device of claim 17, wherein said step A) of said method is accomplished using a noise filter selected from the group consisting of Normalized box filter, median filter, Gaussian filter and bilateral filter.

* * * * *